(No Model.)
N. B. POWELL.
COFFEE ROASTER.
No. 301,754. Patented July 8, 1884.
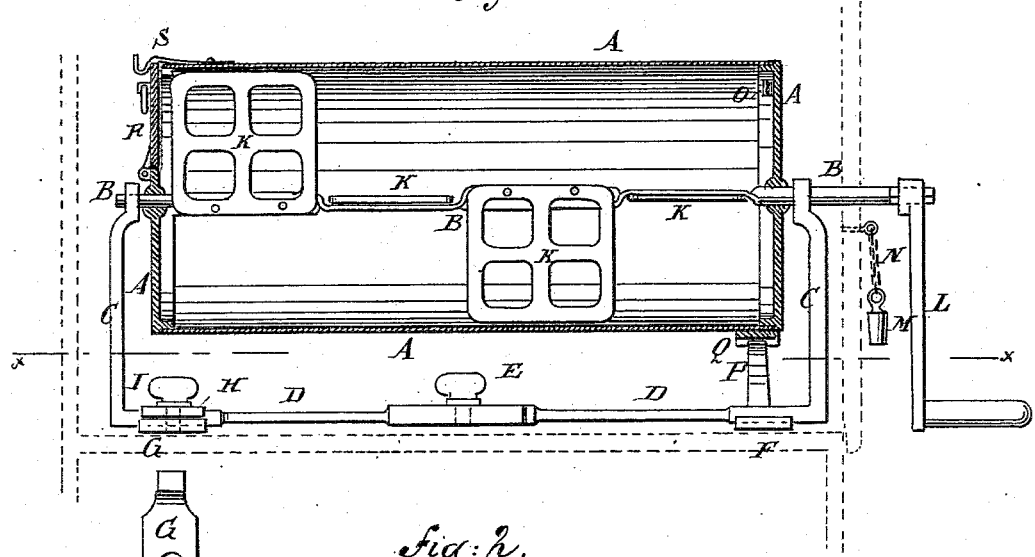
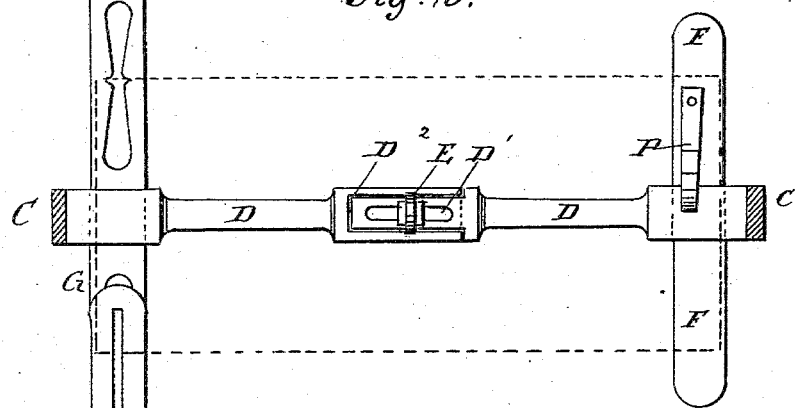
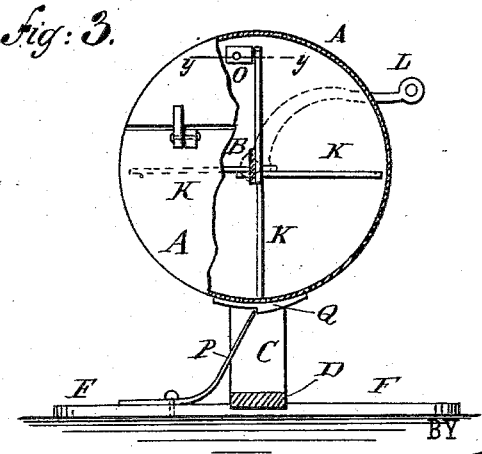
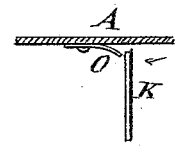
WITNESSES:
INVENTOR:
N. B. Powell
BY Munn & Co.
ATTORNEYS.

UNITED STATES PATENT OFFICE.

NAPOLEON B. POWELL, OF VERSAILLES, ILLINOIS.

COFFEE-ROASTER.

SPECIFICATION forming part of Letters Patent No. 301,754, dated July 8, 1884.

Application filed September 25, 1883. (No model.)

*To all whom it may concern:*

Be it known that I, NAPOLEON B. POWELL, of Versailles, in the county of Brown and State of Illinois, have invented certain new and useful Improvements in Coffee-Roasters, of which the following is a full, clear, and exact description.

Reference is to be had to the accompanying drawings, forming part of this specification, in which similar letters of reference indicate corresponding parts in all the figures.

Figure 1 is a sectional side elevation of my improvement. Fig. 2 is a sectional plan view of the same, taken through the line $x\ x$, Fig. 1. Fig. 3 is an end elevation of the same, partly broken away and in section. Fig. 4 is a sectional view of a part of the same, taken through the line $y\ y$, Fig. 3.

The object of this invention is to improve the construction of the coffee-roasters for which Letters Patent No. 268,725 were issued to me December 5, 1882, in such a manner as to make them more convenient in use.

The invention consists in a coffee-roaster constructed with the feet that support the shaft and cylinder connected by an extensible bar and a clamping-screw, the adjacent ends of the parts of the bar being slotted and recessed, so that the roaster will be held from longitudinal movement in the stove-oven, and the cylinder can be readily detached from its supports. The rear foot of the roaster is provided with a point to enter the slot of the extension-bar and keep the said foot and bar in line with each other. The inner side of the end of the cylinder is provided with a stop-spring to engage with a stirrer-paddle, and cause the shaft to carry the cylinder with it in its revolution in one direction, as will be hereinafter fully described.

A represents a hollow cylinder made with a sheet-iron body and cast-iron ends.

Through bearings in the ends of the cylinder A passes a shaft, B, upon which the said cylinder A revolves. The shaft B revolves in bearings in the upper ends of short standards C, the lower ends of which are attached to or formed upon the ends of the longitudinal bar D. The bar D is made in two parts, the adjacent ends of which overlap each other, and are secured to each other by a clamping-screw, E, passing through a slot, D', in the end of one part of the said bar D, and screwing into the end of the other part. The end of one part of the bar D has a recess, $D^2$, formed in it to receive the end of the other part, as shown in Fig. 2, to prevent the said ends from moving laterally upon each other. The bar D, at or near its forward end, is welded or otherwise secured to the middle part of a short cross-bar or foot, F. The extensible bar D, at or near its rear end, is welded or otherwise secured to a long cross-bar or foot, G.

To one end of the foot G is secured an extension-bar, H, by a clamping-screw, I, which passes through a longitudinal slot in the said extension-bar H and screws into the said foot G.

To the foot G, at a little distance from its end, is attached, or upon it is formed, a point, J, which projects into the slot of the extension-bar H, to keep the said foot and bar in line with each other. With this construction, by loosening the screw E, the bar D can be adjusted to the length of the stove-oven in which the roaster is to be placed, and by loosening the screw I the foot G and the bar H can be adjusted to the breadth of the said oven, so that the said roaster will be held from longitudinal or lateral movement while being used.

To the shaft B, within the cylinder A, are attached four (more or less) perforated plates, K, projecting in different directions, to act as stirrers to agitate the coffee while being roasted. The forward end of the shaft B is extended to pass through a hole in the door of the stove-oven, and is squared to receive the crank L, by means of which the said shaft is rotated. When the roaster is removed from the stove-oven, the hole in the oven-door is closed by a plug, M, which is connected with the said door by a short chain, N, to prevent the said plug from being lost.

To the inner side of the forward end of the cylinder A is attached one end of a short spring, O, the free end of which projects to serve as a stop for the end paddle, K, to strike against when the shaft B is turned in one direction, so that the said shaft B will carry the said cylinder A with it in its revolution. When the shaft B is turned in the other direction, the paddle K strikes against the inclined side of the spring O, presses the said spring down, and passes it without turning the cylinder A.

To the foot F is attached a spring, P, which projects upward, so that its free end will be struck by a stop-block, Q, attached to the cylinder A, when the shaft B is turned in the direction to cause the paddle K to pass the stop-spring O, to hold the said cylinder A from being turned by the friction of the said paddle K against the said spring O. When the shaft B is turned in the direction to carry the cylinder A with it, the stop Q strikes against the inclined side of the spring P, forces the said spring P down and passes it, so that the revolution of the said cylinder will not be checked.

In the inner end of the cylinder A is formed a door, R, for convenience in putting in and taking out the coffee, and which is secured in place, when closed, by a spring-catch, S, attached to the said cylinder. With this construction, when the shaft B is turned in one direction, it will carry the cylinder A with it, and when the said shaft is turned in the other direction the cylinder will be held stationary, and the coffee will be stirred by the paddles K.

Having thus described my invention, I claim as new and desire to secure by Letters Patent—

1. In a coffee-roaster, the combination, with the feet F G, that support the roaster, of the extensible bar D, having slot D' and recess $D^2$ in the overlapped ends of its parts, and the clamping-screw E, substantially as herein shown and described, whereby the roaster will be held from longitudinal movement in the stove-oven, and the cylinder can be readily detached from its supports, as set forth.

2. In a coffee-roaster, the combination, with the foot G, the slotted extension-bar H, and the clamping-screw I, of the point J, substantially as herein shown and described, whereby the said foot and extension-bar are kept in line with each other, as set forth.

3. In a coffee-roaster, the combination, with the cylinder and paddle K, of the spring O, secured to the inner side of the forward end of said cylinder, the stop Q, secured to the outer surface of the cylinder, and the spring P, secured to a suitable support, with its free end projecting upward to adapt it to be struck by said stop Q, substantially as and for the purpose set forth.

NAPOLEON B. POWELL.

Witnesses:
G. H. TIMMONS,
T. T. KEELY.